US012728692B2

(12) United States Patent
Swart et al.

(10) Patent No.: US 12,728,692 B2
(45) Date of Patent: Sep. 8, 2026

(54) HYDRONIC OCCUPANT ZONE HEATING AND COOLING

(71) Applicant: PACCAR Inc, Bellevue, WA (US)

(72) Inventors: Charles Wayne Reinhardt Swart, Bellingham, WA (US); Mazen Nabil Nachawati, Arlington, TX (US); Nicholas Lee Hertlein, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 154 days.

(21) Appl. No.: 18/484,634

(22) Filed: Oct. 11, 2023

(65) Prior Publication Data

US 2025/0121650 A1 Apr. 17, 2025

(51) Int. Cl.
*B60H 1/00* (2006.01)
*B60H 1/14* (2006.01)
*B60H 1/32* (2006.01)

(52) U.S. Cl.
CPC ..... *B60H 1/00278* (2013.01); *B60H 1/00295* (2019.05); *B60H 1/00378* (2013.01); *B60H 1/00885* (2013.01); *B60H 1/143* (2013.01); *B60H 1/32281* (2019.05); *B60H 2001/00307* (2013.01); *B60H 1/00328* (2013.01)

(58) Field of Classification Search
CPC ............ B60H 1/00278; B60H 1/00295; B60H 1/00378; B60H 1/00885; B60H 1/143; B60H 1/32281; B60H 1/00328; B60H 2001/00307
See application file for complete search history.

(56) References Cited

U.S. PATENT DOCUMENTS 5,265,437 A * 11/1993 Saperstein ............. B60H 1/323 62/243
8,082,743 B2 * 12/2011 Hermann ............ H01M 10/613 62/244

(Continued)

FOREIGN PATENT DOCUMENTS

EP 2239811 A1 * 10/2010 .......... H01M 10/486
EP 3 045 331 A2 7/2016
WO WO-2021067163 A1 * 4/2021 ......... B60H 1/32284

OTHER PUBLICATIONS

Extended European Search Report for European Patent Application No. 24195436.1 mailed Feb. 10, 2025, 11 pages.

(Continued)

*Primary Examiner* — Ljiljana V. Ciric

(57) ABSTRACT

A vehicle includes an occupant zone, a battery, a battery heating and cooling system, sensors, and a battery management system. The battery heating and cooling system includes a refrigeration circuit and a fluid battery circuit, the fluid battery circuit including a battery heating/cooling loop and a hydronic system heating/cooling loop. The sensors include at least one occupant sensor that senses the presence of an occupant in an occupant zone. The battery management system operates the refrigeration circuit to heat or cool coolant circulating through the battery heating/cooling loop. When conditions are met for providing ancillary heating or cooling, the battery management system directs the coolant circulating though the battery heating/cooling loop to the hydronic system heating/cooling loop to heat or cool the occupant zone.

6 Claims, 5 Drawing Sheets

(56) References Cited

U.S. PATENT DOCUMENTS 9,827,827 B2* 11/2017 Bidner ............... B60H 1/00785
10,118,460 B1* 11/2018 Blatchley ............ H01M 10/443
10,576,806 B1* 3/2020 Madireddi ......... B60H 1/00742
11,364,769 B2* 6/2022 Bellino .................. B60H 1/321
11,407,280 B1* 8/2022 Turudic ................ B60L 3/0023
11,420,496 B2* 8/2022 Xie ......................... F24H 1/009
11,491,843 B2* 11/2022 Williams ........... B60H 1/00642
11,728,537 B2* 8/2023 Shrivastava ...... H01M 10/6561 429/120
11,890,914 B2* 2/2024 Mazaira .................. B60L 58/27
11,919,364 B2* 3/2024 Xie .................... B60H 1/00328
11,950,397 B2* 4/2024 Tobiassen .......... H05K 7/20209
12,099,387 B2* 9/2024 McEathron ............. G06F 1/206
12,304,353 B2* 5/2025 Huang .................... B60L 1/003
12,594,819 B2* 4/2026 Tian ................... B60H 1/00278
2013/0152614 A1* 6/2013 Traudt .................... B60L 58/27 62/196.1
2016/0107502 A1* 4/2016 Johnston ............ B60H 1/00921 165/202
2019/0176578 A1* 6/2019 Blatchley ............... B60H 1/323
2019/0351732 A1* 11/2019 Rajaie ................ B60H 1/00392
2020/0353795 A1* 11/2020 Choi .................. B60H 1/00278
2020/0398636 A1* 12/2020 He ..................... B60H 1/00507
2021/0188043 A1* 6/2021 Smith .................. B60H 1/3204
2021/0242518 A1 8/2021 Shrivastava et al.
2022/0032724 A1 2/2022 Rotenburg et al.
2023/0074313 A1 3/2023 Mazaira et al.
2023/0264601 A1* 8/2023 Haberlein ............... B60L 58/27 701/22
2023/0406069 A1* 12/2023 Turudic .................. B60L 58/27
2024/0066941 A1* 2/2024 Alkhulaifi ............... B60L 58/26
2024/0102867 A1* 3/2024 Yi .......................... G01K 1/024
2024/0314983 A1* 9/2024 Clemans ............ H05K 7/20881
2025/0121650 A1* 4/2025 Swart ................. B60H 1/00278
2025/0214394 A1* 7/2025 Turudic ............. B60H 1/00278
2026/0048640 A1* 2/2026 Feltham ............. B60H 1/00742

OTHER PUBLICATIONS

Cotton Cool Water Shirt, White, Short Sleeve—https://www.pegasusautoracing.com/productselection.asp?Product=CS410, retrieved Apr. 12, 2024.

Cotton Cool Water Shirt, White, Short Sleeve with Hood, https://www.pegasusautoracing.com/productselection.asp?Product=CS412, retrieved Apr. 12, 2024.

Cool Shirt Black 2Cool Water-Cooled Compression Shirt, https://www.pegasusautoracing.com/productselection.asp?Product=CS552, retrieved Apr. 12, 2024.

Cool Shirt 2Cool Water FR Fire Resistant Shirt, Long Sleeve, https://www.pegasusautoracing.com/productselection.asp?Product=CS406, retrieved Apr. 12, 2024.

Melancon Blog: EV Battery Cooling: Challenges and Solutions, https://www.laserax.com/blog/ev-battery-cooling retrieved Apr. 12, 2024.

"How to link an electric vehicle battery cooling system with the air conditioning system" https://community.sw.siemens.com/s/article/how-to-link-an-electric-vehicle-battery-cooling-system-with-the-air-conditioning-system, retrieved Apr. 12, 2024.

* cited by examiner

HYDRONIC OCCUPANT ZONE HEATING AND COOLING

BACKGROUND

Electric vehicles (including hybrid vehicles) use a rechargeable battery to operate an electric motor and/or other components of the vehicle. Optimal performance, efficiency, and longevity of the battery may be achieved when within a target temperature range (e.g., 60° F. to 80° F.). For instance, in addition to delivering its maximum power and energy efficiency when operating within the target operating temperature range, the battery may additionally charge faster. For instance, the battery may reach its maximum charging speed and maintain it for longer when it is at its optimum temperature. Thus, a temperature control unit may cool the battery when the temperature of the battery exceeds an upper threshold and heats the battery when the temperature of the battery is below a lower threshold of the target temperature ranges. Additionally, an electric vehicle may include one or more occupant zones where a driver and/or passengers may be located (e.g., a cabin, a sleeper compartment). The occupant zone(s) may be designed to provide comfort to the vehicle occupants, such as by providing temperature regulation within a target occupant zone temperature range. A typically comfortable temperature range for occupants may correspond with the target temperature range of the battery.

While relatively specific examples have been discussed, it should be understood that aspects of the present disclosure should not be limited to solving the specific examples identified in the background.

SUMMARY

The disclosure generally relates to providing ancillary heating and cooling of an occupant zone of a vehicle using a battery heating and cooling system. For instance, the battery heating and cooling system may be used for thermal management of temperature-sensitive components (e.g., a battery) of a battery electric vehicle. The battery heating and cooling system may be in fluid communication with an occupant zone hydronic system and may direct coolant to the occupant zone hydronic system when heating/cooling the battery.

According to an example implementation, a method is described, comprising: operating a battery heating and cooling system to heat or cool a battery of a vehicle toward a target battery temperature; receiving an indication to provide ancillary heating or cooling to an occupant zone of the vehicle; determining conditions are sufficient for providing ancillary heating or cooling; and directing coolant in a fluid battery circuit of the battery heating and cooling system to the occupant zone to heat or cool the occupant zone.

According to another example implementation, a vehicle is described, comprising: an occupant zone; a battery; a battery heating and cooling system including a refrigeration circuit and a fluid battery circuit, the fluid battery circuit including a battery heating/cooling loop and a hydronic system heating/cooling loop; sensors; and a battery management system including: at least one processor; and a memory including instructions, which when executed by the at least one processor, cause the battery heating and cooling system to: operate the refrigeration circuit to heat or cool coolant circulating though the battery heating/cooling loop to heat or cool the battery toward a target battery temperature; receive an indication to provide ancillary heating or cooling to the occupant zone; determine conditions are sufficient for providing ancillary heating or cooling; and direct the coolant circulating though the battery heating/cooling loop to the hydronic system heating/cooling loop to heat or cool the occupant zone.

According to another example implementation, a system is described, comprising: at least one processing unit; and a memory including instructions, which when executed by the processing unit, cause the system to: operate a battery heating and cooling system in a preconditioning cycle to heat or cool a battery of a vehicle toward a target battery temperature to charge the battery; receive an indication to provide ancillary heating or cooling to an occupant zone of the vehicle; determine conditions are sufficient for providing ancillary heating or cooling; and direct coolant in a fluid battery circuit of the battery heating and cooling system to tubing embedded in a hydronic object in the occupant zone to heat or cool the occupant zone.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
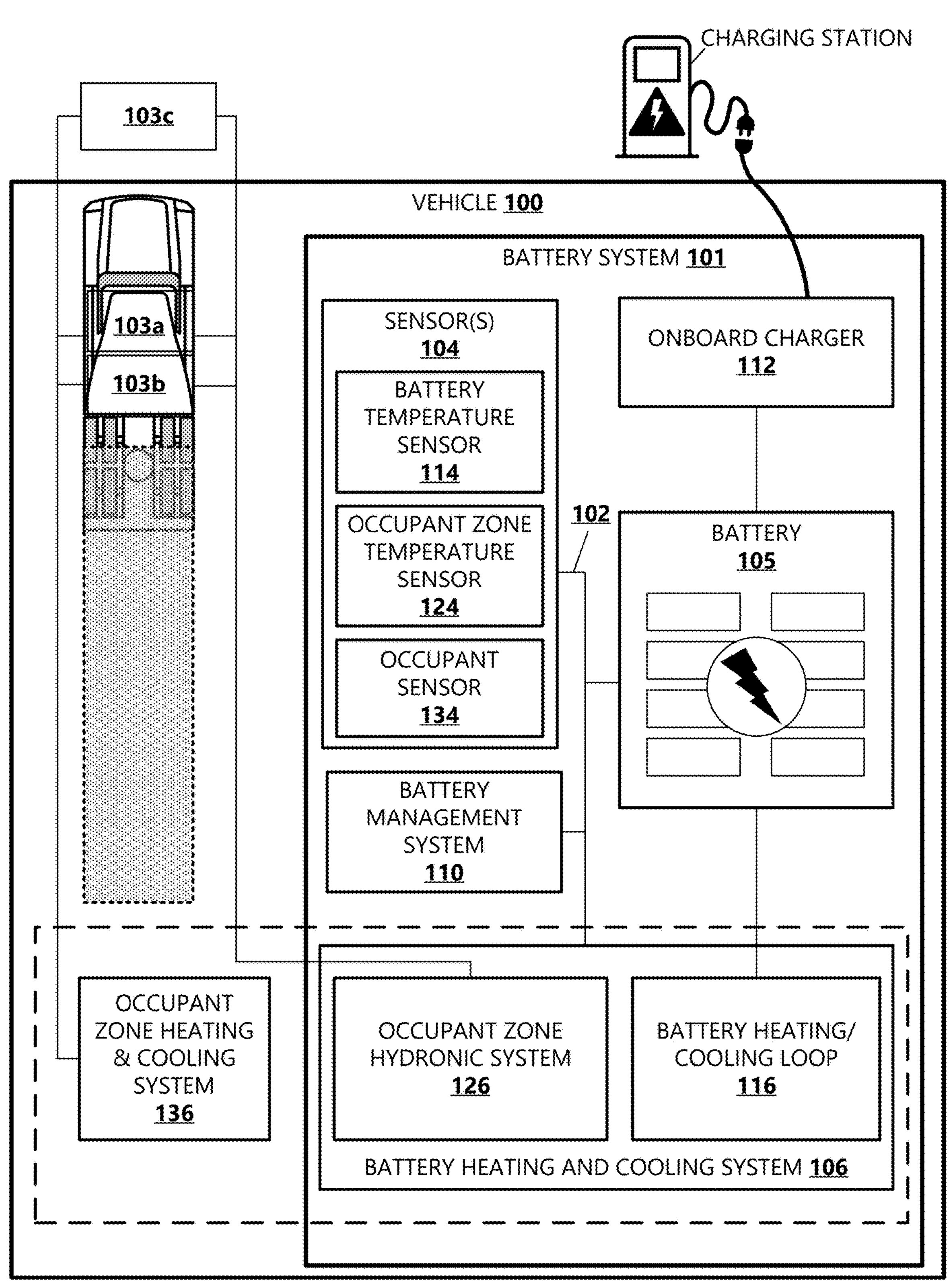
FIG. 1 is a block diagram illustrating an operating environment in which aspects of a battery heating and cooling system including an occupant zone hydronic system may be implemented according to an example.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. The following detailed description is, therefore, not to be taken in a limiting sense.

As mentioned above, a vehicle battery may be temperature sensitive and may be thermally regulated by a battery heating and cooling system toward a target battery temperature. It may be desirable to use the battery heating and cooling system to provide ancillary heating and cooling to an occupant zone of a vehicle. For instance, the target battery temperature may correspond to a target occupant zone temperature, where the battery heating and cooling system can be efficiently used to redirect heating and cooling to heat or cool the occupant zone. Accordingly, systems and methods are described for providing ancillary heating and cooling of an occupant zone via the battery heating and cooling system. These and other examples are discussed below with reference to FIGS. 1-5.

FIG. 1 is a block diagram illustrating a vehicle 100 including an example battery system 101. In some examples, and as depicted in various figures, the vehicle 100 is a truck, such as Class 8 truck. In other examples, the vehicle 100 is another type of vehicle, such as a recreational vehicle, a passenger vehicle, a motorcycle, a bus, a light, medium, or heavy-duty vehicle, a train, a boat, yacht, motor home, etc. It will be appreciated that aspects of the disclosed subject matter may also have wide application and, therefore, the following descriptions and illustrations herein should be considered illustrative in nature and not limiting the scope of the claimed subject matter. The vehicle 100 includes at least one occupant zone 103*a*-103*c* (collectively, occupant zone 103). For instance, the vehicle 100 may include a first occupant zone 103*a* representing a cab compartment where one or more occupants (e.g., a driver and passengers) may be seated or positioned and may be a primary zone where the driver interacts with the vehicle's controls to drive the vehicle 100. The vehicle 100 may further include a second occupant zone 103*b* representing a sleeper compartment attached to the cab that may provide various resting and sleeping accommodations for vehicle occupants. For instance, a driver of the vehicle 100 may occupy the second occupant zone 103*b* during a rest break or overnight stop. In other examples, one or more occupants may occupy the second occupant zone 103*b* while a driver drives the vehicle 100. In further examples, a third occupant zone 103*c* may be represent an area located exterior to the vehicle 100. For instance, the third occupant zone 103*c* may be an area occupied by one or more individuals for a period of time when not occupying the interior of the vehicle 100, such as when camping, picnicking, etc.

According to examples, the vehicle 100 may be an electric vehicle (including a hybrid vehicle) that includes one or more electric motors for propulsion. The electric motors may convert electrical energy supplied by a battery system 101 into mechanical energy to propel the vehicle 100. In examples, the battery system 101 includes a battery pack (herein generally referred to as a battery 105). The battery 105 stores electrical energy and supplies power to the one or more electric motors of the vehicle 100. The battery 105 may be rechargeable and based on various chemistries, such as lithium-ion. The battery 105 may have various characteristics, such as energy density, capacity, charging speed, charging efficiency, etc. In examples, the battery system 101 includes an onboard charger 112 that converts alternating current (AC) from a power source, such as a charging station or wall outlet, into direct current (DC) to recharge the battery 105. The battery temperature may have an impact on various aspects of the battery 105. For instance, when recharging the battery 105, factors such as recharging speed, charging efficiency, the total charge capacity, and other battery characteristics may be influenced, at least in part, by the battery's temperature. Additionally, when operating the vehicle 100, battery temperature may affect performance, safety, lifespan, and other characteristics of the battery 105.

In examples, the vehicle 100 includes a first heating and cooling system, herein referred to as a battery heating and cooling system 106. The battery heating and cooling system 106 may be controlled by a battery management system 110 to heat and cool the battery 105. As will be described in further detail below, in some examples, the battery heating and cooling system 106 may be controlled by a battery management system 110 to heat and cool different areas and/or components of the vehicle 100, such as heating/cooling an occupant zone 103 via an occupant zone hydronic system 126.

In examples, the vehicle 100 further includes a second heating and cooling system, herein referred to as an occupant zone heating and cooling system 136 that heats and cools one or more occupant zones 103 of the vehicle 100. In some examples, the occupant zone heating and cooling system 136 may heat/cool other areas and/or components of the vehicle 100. In some examples, the battery heating and cooling system 106 and the occupant zone heating and cooling system 136 are separate systems. In other examples, the battery heating and cooling system 106 and the occupant zone heating and cooling system 136 are subsystems included in a same heating and cooling system, as represented in FIG. 1 as a dashed line. In some examples, the battery heating and cooling system 106 and/or the occupant zone heating and cooling system 136 are powered by the battery 105. In other examples (e.g., in a hybrid electric vehicle 100), an internal combustion engine may power the battery heating and cooling system 106 and/or the occupant zone heating and cooling system 136.

In examples, a battery management system 110 of the battery system 101 uses the battery heating and cooling system 106 to regulate the battery's temperature toward a target battery temperature (e.g., between 60° F. to 80° F.) for charging and during operation. For instance, the battery management system 110 receives measurements from various sensors 104, including one or more battery temperature sensors 114 that collect temperature measurements of the battery 105 and transmit the temperature measurements to the battery management system 110, which controls the battery heating and cooling system 106 to heat and cool the battery 105 toward the target battery temperature. The battery management system 110 may monitor and manage other aspects of the battery 105, such as the battery's health, state of charge, etc., to provide safe and efficient operation of the battery 105. According to examples, the sensors 104, battery management system 110, and battery heating and cooling system 106 communicate via a wired or wireless link and/or indirectly through a vehicle-wide network 102, that may be implemented using any number of different communication protocols.

In examples, the term "preconditioning" is used to describe regulating the temperature of the battery 105 of the vehicle 100 in preparation of battery recharging. Thus, the battery management system 110 may regulate or precondition the battery temperature in order to cause the battery 105 to adjust toward a target preconditioning battery temperature. In some examples, the target preconditioning battery temperature may be a predetermined or configurable temperature range within which the battery 105 exhibits desired recharging characteristics. In examples, recharging the battery 105 at the target preconditioning battery temperature may increase charging efficiency of the battery 105. For instance, cold temperatures can hinder the charging process, requiring more time for the battery 105 to reach a full charge, while excessive heat can reduce the battery's ability to accept charge effectively. Preconditioning may be performed on demand, at a fixed or variable interval (e.g., time or distance) from a charging station, or at the charging station.

Additionally, during operation of the vehicle 100, the temperature of the battery 105 may influence the performance, efficiency, and overall lifespan of the battery 105. In examples, the battery management system 110 may regulate the battery temperature in order to cause the battery 105 to adjust toward a target operating battery temperature. In some examples, the target operating battery temperature may be a predetermined or configurable temperature range within which the battery 105 may exhibit desired operating characteristics. For instance, operating the battery 105 at the target operating battery temperature may provide better power output and responsiveness of the battery 105 (e.g., increased performance), less resistance and, thus, less energy wasted during charging and discharging (e.g., increased charging efficiency), a reduced rate of capacity loss (e.g., increased overall lifespan of the battery 105), etc. When the battery temperature is below the target battery temperature, the battery management system 110 may cause the battery heating and cooling system 106 to run a heating cycle to heat the battery 105 toward the target battery temperature. When the battery temperature is above the target battery temperature, the battery management system 110 may cause the battery heating and cooling system 106 to run a cooling cycle to cool the battery 105 toward the target battery temperature.

According to an example implementation, the occupant zone hydronic system 126 is included in or connected to the battery heating and cooling system 106. The occupant zone hydronic system 126 may include a network of tubes or channels that are embedded in one or more objects through which liquid coolant flows, where the object(s) may be located in one or more occupant zones 103. The occupant zone hydronic system 126 is configured to circulate the liquid coolant to heat and cool at least an area of an occupant zone 103. For instance, the occupant zone hydronic system 126 may include one or more hydronic objects, such as a hydronic sleeping pad, mattress, blanket, bag, clothing, a hydronic floor, hydronic paneling, headliner, a hydronic seat, a table, or other surface of the cab or sleeper of the vehicle 100 or other type of object in which tubes are embedded that circulate heated or cooled liquid to provide heating or cooling. For instance, conductive zone heating/cooling may be provided via the occupant zone hydronic system 126, rather than convection. In some examples, the battery heating and cooling system 106 may be used to provide zoned heating/cooling to the occupant zone 103, where the heating/cooling may be focused on a surface with which an occupant may physically touch. In some examples, one or more hydronic objects may be located exterior to the vehicle 100. For instance, in a camping scenario, a camper may use a hydronic sleeping pad outside the vehicle 100, where the hydronic sleeping pad may be included in the occupant zone hydronic system 126 and connected to the battery heating and cooling system 106. In some examples, one or more hydronic objects may include multiple zones of tubing through which flow of the liquid coolant can be controlled for providing zoned heating or cooling via the hydronic object. In further examples, the occupant zone hydronic system 126 may include a radiator, a radiant dish aimed towards an area (e.g., a bed, a seat) of the occupant zone 103. Other types of hydronic objects are possible and are within the scope of the present disclosure. In examples, liquid coolant may comprise a refrigerant or other heat-transfer fluid. In nonexclusive examples, liquid coolant may comprise water. In other examples, the coolant may comprise a solution of water and an organic chemical (e.g., ethylene glycol, diethylene glycol, propylene glycol), or it may comprise a waterless fluid, among other possibilities.

In some examples, the occupant zone hydronic system 126 includes one or more occupant zone temperature sensors 124 that collect temperature measurements of the one or more occupant zones 103 and transmit the temperature measurements to the battery management system 110. In other examples, the occupant zone hydronic system 126 includes one or more thermostats or control panels that allow for a user to input a request for heating/cooling, a temperature or volume preference, or other adjustment. In further examples, one or more occupant sensors 134 may be included in the occupant zone(s) 103 and/or occupant zone hydronic system 126. The occupant sensor(s) 134 may include a camera, radar, pressure, or other technology that senses the presence of an occupant in an occupant zone 103 and/or in contact with or proximate to a hydronic object. Sensor and user inputs may be communicated to the battery management system 110 via a vehicle-wide network 102, such as a controller area network or other wired or wireless network.

According to an aspect of the present disclosure, the battery management system 110 may control the battery heating and cooling system 106 to heat or cool an occupant zone 103 via the occupant zone hydronic system 126. In some examples, the battery management system 110 may heat/cool a hydronic object and/or an area in the occupant zone 103 including the hydronic object toward a target occupant zone temperature. In some examples, the target occupant zone temperature may be or be associated with (e.g., within a threshold of) the target battery zone temperature. The battery management system 110 may determine to use the battery heating and cooling system 106 to direct heating/cooling to the occupant zone 103 based on one or a combination of conditions or factors, such as: receiving a user request for heating/cooling via the occupant zone hydronic system 126, when the occupant zone is below/above the target occupant zone temperature, when preconditioning the battery 105, when heating/cooling the battery 105 during vehicle operation (e.g., driving), when an occupant is detected in the occupant zone 103, when the occupant is detected in contact with or proximate to a hydronic object in the occupant zone hydronic system 126, vehicle load conditions, battery temperature measurements, ambient temperature measurements, and/or other factors and conditions. In some examples, the battery management system 110 may determine to use the battery heating and cooling system 106 to precondition the occupant zone 103 for the occupant. As will be described in further detail below, the battery heating and cooling system 106 may include one or more valves that are controlled by the battery management system 110 to direct heating and/or cooling to one or both of a battery heating/cooling loop 116 and the occupant zone hydronic system 126.

Figure 2:
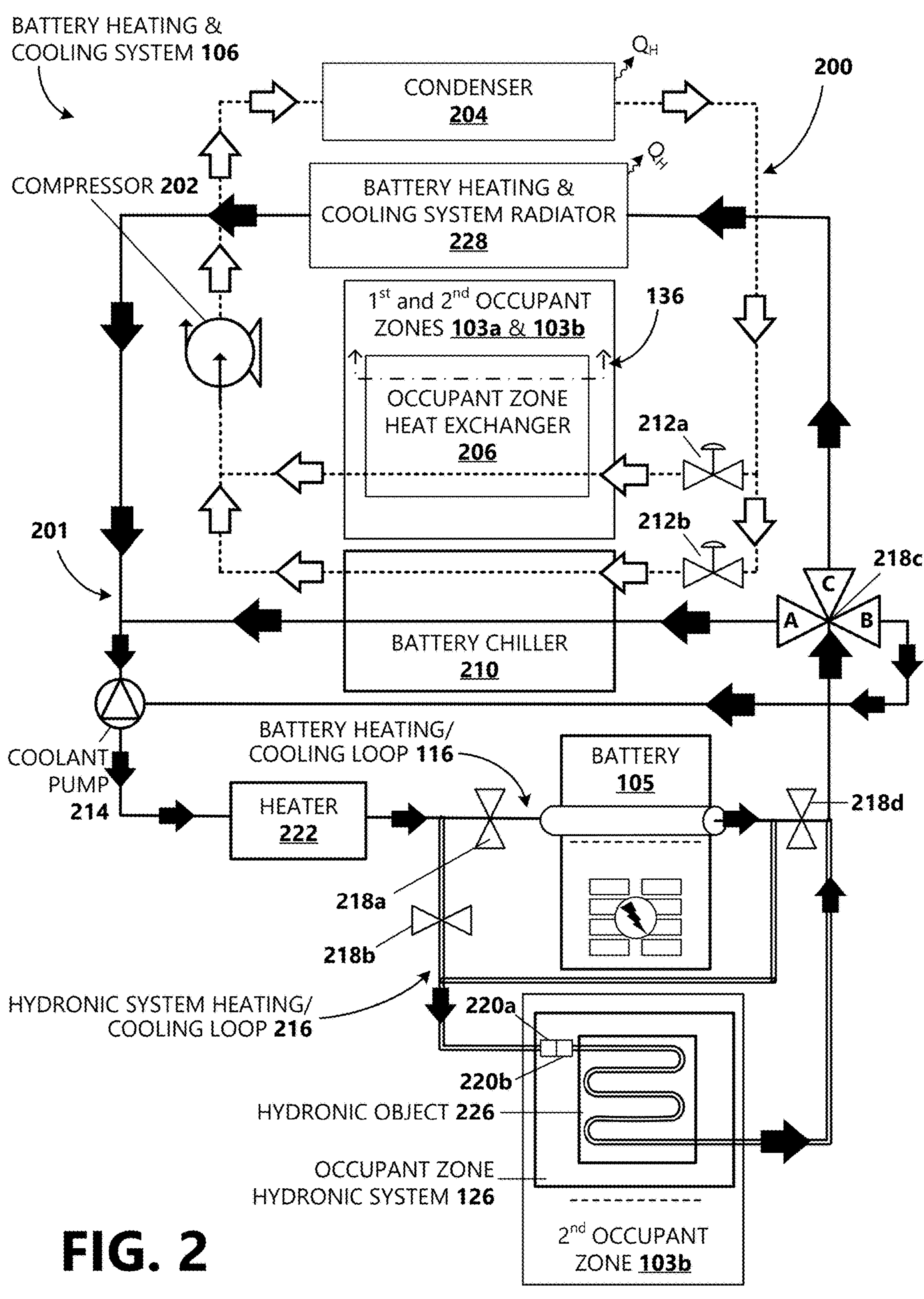
FIG. 2 is a schematic view of an example battery heating and cooling system and occupant zone hydronic system.

With reference now to FIG. 2, a schematic diagram of an example battery heating and cooling system 106 is illustrated. In the depicted example, an occupant zone heating and cooling system 136 is included in the battery heating and cooling system 106. In other examples, the battery heating and cooling system 106 and the occupant zone heating and cooling system 136 may be separate systems.

The battery heating and cooling system 106 may include a refrigeration circuit 200, which is represented by a short-dashed line and white arrows, and a fluid battery circuit 201, which is represented by a solid line and black arrows. The refrigeration circuit 200 may include a compressor 202, a condenser 204, and a battery chiller 210. In some examples, the refrigeration circuit 200 further includes an occupant zone heat exchanger 206 (sometimes referred to as an evaporator). During use, the compressor 202 may be driven by the battery 105, or in a hybrid vehicle 100, the compressor 202 may be driven by the engine of the vehicle 100 by any number of suitable methods, such as by a belt and pulley system. The compressor 202 compresses a refrigerant, producing a hot, high-pressure refrigerant at an outlet of the compressor 202.

The hot gas refrigerant may be run through heat exchange coils of the condenser 204, dissipating heat and condensing into liquid refrigerant. The condenser 204 may be generally arranged such that relatively cool air (typically ambient air) is driven (such as by an engine cooling fan) over a set of heat exchange coils. In this regard, the condenser 204 may be generally located at the front end of the vehicle 100. As the cool air passes over the heat exchange coils, heat is removed from the refrigerant, causing the refrigerant to condense into a high-pressure liquid, which may be accumulated in a receiver. From the receiver, one or more expansion valves 212 may flash the liquid refrigerant into a low pressure, low temperature gas and/or liquid mixture. For instance, a first expansion valve 212*a* may include a shut-off to allocate cooling power to the fluid battery circuit 201. A second expansion valve 212*b* may include a shut-off to allocate cooling power to the occupant zone heating and cooling system 136.

When allocating cooling power to the occupant zone heating and cooling system 136, the now low-pressure refrigerant may enter and flow through a series of tubes within the occupant zone heat exchanger 206. As the cold refrigerant flows through the tubes, it exchanges thermal energy with air blown through a set of fins attached to the heat exchanger tubes into a first 103*a* and/or a second occupant zone 103*b*. Thus, cooled air is blown into the occupant zone(s) 103. The occupant zone heating and cooling system 136 may include one or more fans, various air mix dampers, air directional dampers, or diverters to direct the airflow. As the refrigerant absorbs heat in the occupant zone heat exchanger 206, it turns back into a low-pressure gas, and the cycle repeats.

When allocating cooling power to the fluid battery circuit 201, the now low-pressure refrigerant may enter and flow through a series of tubes within the battery chiller 210. As the cold refrigerant flows through the tubes of the battery chiller 210, it exchanges thermal energy with a liquid coolant that is circulated through the battery chiller 210 via a coolant pump 214. In some examples, the coolant is circulated through the battery heating/cooling loop 116, which is represented in FIG. 2 as a single solid line. In examples, the battery heating/cooling loop 116 includes tubing in heat exchange communication with the battery 105. The battery heating/cooling loop 116 may circulate the coolant around the battery 105 to carry heat from the battery 105 to another location (e.g., to cool the battery toward the target battery temperature). In some examples, the coolant is circulated by the coolant pump 214 through a hydronic system heating/cooling loop 216 (represented by a double solid line).

The hydronic system heating/cooling loop 216 may circulate the coolant through the occupant zone hydronic system 126, where the occupant zone hydronic system 126 may include at least one hydronic object 226 located in at least one occupant zone 103 (e.g., the second occupant zone 103*b*). The coolant may carry heat from the occupant zone 103*b* to another location (e.g., to cool the hydronic object 226 and cool at least an area of the second occupant zone 103*b*). In some examples, the hydronic system heating/cooling loop 216 includes a first connector 220*a* (e.g., a quick connector) that connects to a second connector 220*b* (e.g., another quick connector) included in the hydronic system 126 to complete the hydronic system heating/cooling loop 216. For instance, the second connector 220*b* may be included in the hydronic object 226, where the hydronic object 226 may be selectably attached and detached to the occupant zone hydronic system 126 and may further be fluidly connected to the hydronic system heating/cooling loop 216.

In some examples, the refrigeration circuit 200 includes a reversing valve that may be positioned to set the refrigeration system 200 into one of a cooling cycle or a heating cycle. For instance, the battery management system 110 may cause the battery heating and cooling system 106 to operate in the heating cycle, where the refrigeration system 200 may operate as a heat pump to warm the battery 105 and/or occupant zone(s) 103 by extracting heat from ambient air and/or waste heat from the motor or power electronics and transferring it into the battery chiller 210 and/or occupant zone heat exchanger 206.

In some examples, the battery heating and cooling system 106 includes a heater 222 (e.g., an electric resistance heater or other heating system) that heats the coolant flowing through the battery heating/cooling loop 116 and/or the hydronic system heating/cooling loop 216 when in a heating cycle. For instance, the heater 222 may be controlled by the battery management system 110 to warm the battery 105 and/or the occupant zone 103 via the occupant zone hydronic system 126.

In examples, the battery management system 110 may further control one or more valves 218*a*-218*d* (collectively, valves 218) included in the fluid battery circuit 201. The valves 218 may control (e.g., decrease, increase, or divert) the flow of coolant along one or more paths in the fluid battery circuit 201. For instance, the valves 218 may be controlled to allocate heating or cooling power to the battery 105 (e.g., via the battery heating/cooling loop 116) and/or to an occupant zone hydronic system 126 (e.g., via the hydronic system heating/cooling loop 216). As an example, the battery management system 110 may control a first valve 218*a* and a second valve 218*b* to adjust the coolant flow to the battery heating/cooling loop 116 and/or the hydronic system heating/cooling loop 216. As another example, the battery management system 110 may control a third valve 218*c* that may be positioned after the battery heating/cooling loop 116 and the hydronic system heating/cooling loop 216. In the example depicted in FIG. 2, the third valve 218*c* is a 3-way valve that may be positioned into a first position corresponding to a path A, a second position corresponding to a path B, and a third position corresponding to a path C. However, in other examples, fewer or more flow paths may be included in the battery heating and cooling system 106.

When the third valve 218*c* is positioned to direct the coolant flow through path A, the coolant may be diverted towards the battery chiller 210. The battery chiller 210 may dissipate heat from the coolant (when cooling the battery 105 and/or occupant zone hydronic system 126) or heat the coolant (when heating the battery 105 and/or occupant zone hydronic system 126) before it is recirculated back to the battery cooling loop 116 and/or the hydronic system heating/cooling loop 216. Alternatively, when the third valve 218*c* is adjusted to direct the flow through path B, the coolant may be returned to the coolant pump 214, which then circulates it back through the battery cooling loop 116 and/or the hydronic system heating/cooling loop 216. Path B may be used when using the heater 222 to heat the coolant in a heating cycle or to continuously circulate the coolant through the battery heating and cooling system 106. When the third valve 218*c* is set to direct the flow through path C, the coolant may be directed through a battery heating and cooling system radiator 228 that may operate as a cooling mechanism. For instance, path C may be used when the ambient temperature is low or when the battery 105 does not require active cooling. The battery heating and cooling system radiator 228 may dissipate heat from the battery 105 and/or occupant zone hydronic system 126 to the surrounding air, cooling the coolant before it returns to the before it is recirculated back to the battery cooling loop 116 and/or the hydronic system heating/cooling loop 216.

In some examples, such as when using the battery heating and cooling system 106 to cool the battery 105 and when a temperature measurement of the occupant zone 103 is below a target occupant zone temperature, the battery management system 110 may determine to control a fourth valve 218*d*. The fourth valve 218*d* may be positioned to redirect the coolant exiting the battery 105 to the occupant zone hydronic system 126. For instance, heat transferred to the coolant when cooling the battery 105 may be recovered by the occupant zone hydronic system 126 and used to heat the occupant zone 103.

In examples, the battery management system 110 may control one or a combination of the valves 218 to adjust the battery temperature toward a target battery temperature and to adjust the occupant zone temperature toward a target occupant zone temperature. In some examples, the battery management system 110 may control one or more valves 218 to adjust the occupant zone temperature based on a received request. In some examples, the request may be based on a user input received via a control panel associated with the occupant zone 103 or occupant zone hydronic system 126 (e.g., including the hydronic object 226). For instance, a user may select an "on" setting, a cooling or heating cycle setting, a temperature or volume setting, or another type of control that may be received as a request for heating or cooling using the occupant zone hydronic system 126.

In other examples, in addition to monitoring temperature measurements of the battery 105, the battery management system 110 may further receive and monitor temperature measurements of one or more occupant zones 103 (e.g., received from the occupant zone temperature sensor(s) 124). In some examples, the temperature measurements of one or more occupant zones 103 include temperature measurements of the occupant zone hydronic system 126 and/or one or more hydronic objects in the occupant zone hydronic system 126. The battery management system 110 may evaluate whether the occupant zone temperature measurements are outside a target occupant zone temperature and whether to open the battery heating/cooling loop 116 to direct heating/cooling to the occupant zone hydronic system 126.

In some examples, the battery management system 110 may allow for the occupant zone hydronic system 126 to be utilized when the battery heating and cooling system 106 is operating to heat/cool the battery 105, such as during a preconditioning cycle or while operating the vehicle 100. In the preconditioning cycle, the battery management system 110 may use the battery heating and cooling system 106 to adjust the temperature of the battery 105 to a target preconditioning battery temperature for recharging the battery 105. Prior to and/or while the battery 105 is charging (e.g., at a charging station), the battery heating and cooling system 106 may operate in the preconditioning cycle to heat/cool the battery 105. During preconditioning, an indication may be received to direct heating/cooling to the occupant zone hydronic system 126 (e.g., to heat or cool an area of an occupant zone 103). For example, the battery management system 110 may receive a temperature measurement of the occupant zone 103 outside a desired target occupant zone temperature, receive a user input via a control panel to turn heating/cooling on and/or an amount of desired heating/cooling, etc., and determine to control one or more of the valves 218 to allow the coolant to flow through the hydronic system heating/cooling loop 216, to operate the heater 222, and/or perform other operations to provide heating/cooling to the occupant zone 103.

Thus, in some examples, the battery heating and cooling system 106 may be used to provide ancillary occupant zone heating and/or cooling via the occupant zone hydronic system 126 without using the occupant zone heating and cooling system 136. In other examples, the battery heating and cooling system 106 may be used to provide additional heating/cooling to the occupant zone 103 via the occupant zone hydronic system 126 (e.g., in addition to heating/cooling provided by the occupant zone heating and cooling system 136). For instance, when conditions are determined to be sufficient for providing ancillary heating or cooling to the occupant zone 103, the battery management system 110 may direct coolant to the occupant zone hydronic system 126 to provide ancillary heating/cooling. Some example conditions that may be evaluated by the battery management system 110 include vehicle load conditions, occupant zone temperature measurements, battery temperature measurements, ambient temperature measurements, occupant location/presence, etc. In some examples, the battery management system 110 may prioritize heating/cooling based on the battery heating and cooling system's requirements and available resources. For instance, in certain conditions, such as when under higher vehicle load conditions, when ambient temperatures are above or below a certain temperature, etc., the battery management system 110 may prioritize the battery heating/cooling loop 116 over the hydronic system heating/cooling loop 216 to avoid underheating or overheating of critical systems (e.g., the battery 105).

Figure 3:
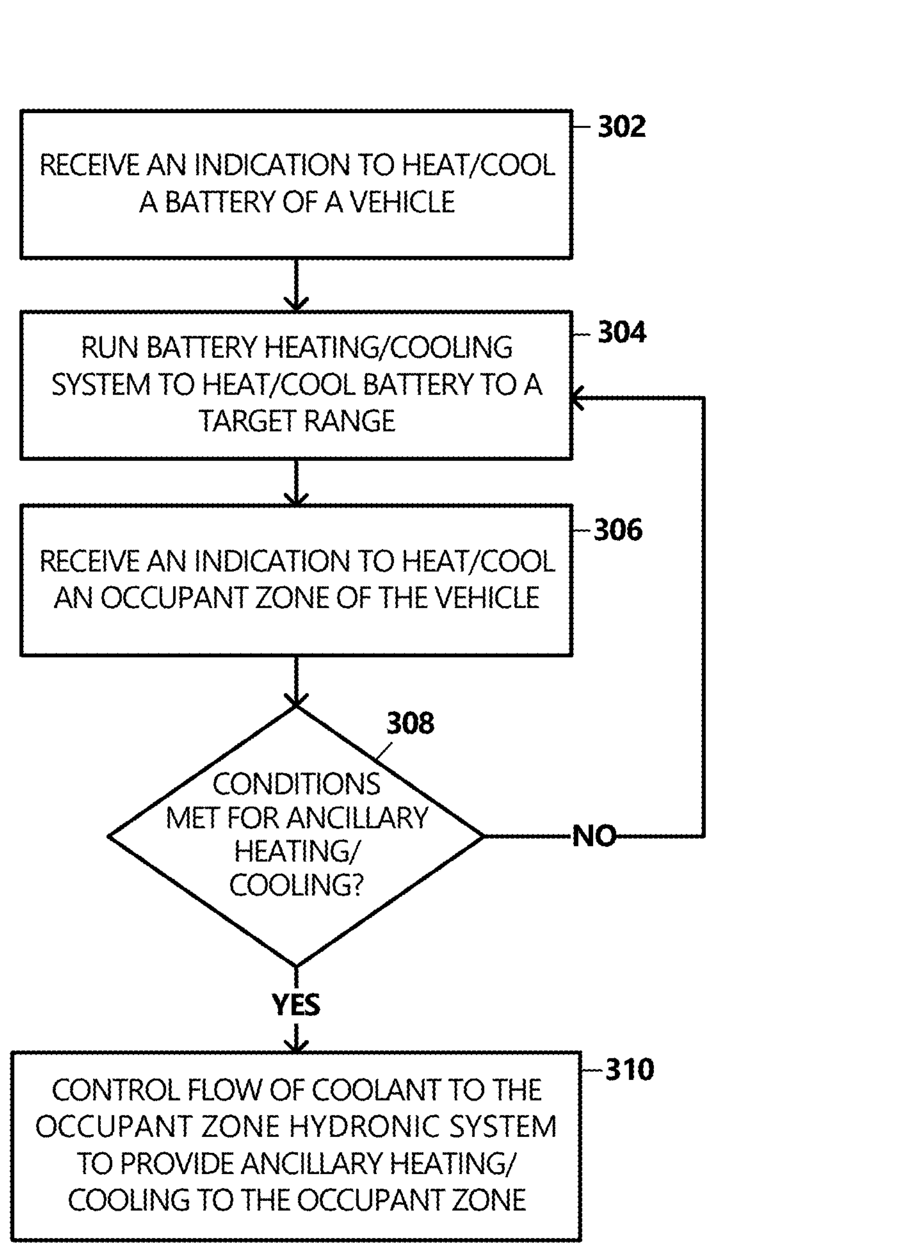
FIG. 3 is a flow diagram illustrating processing steps of a method that can be used to provide ancillary heating/cooling of an occupant zone via a battery heating and cooling system according to an example.

With reference now to FIG. 3, a flow diagram is provided illustrating operations corresponding to processing steps of an example method 300 that can be used to provide ancillary heating and cooling of an occupant zone 103 of a vehicle 100 via a battery heating and cooling system 106. For instance, one or more of the operations may be performed by the battery management system 110. At operation 302, an indication to heat/cool the battery 105 of the vehicle 100 may be received. In some examples, the indication may be a received battery temperature measurement outside a target operating battery temperature (e.g., during operation of the vehicle 100). In other examples, the indication may correspond to a determination to precondition the battery 105 for recharging the battery 105. In response to the indication, at operation 304, the battery heating and cooling system 106 may be run to adjust the temperature of the battery 105 toward the target battery temperature (e.g., the target operating battery temperature during vehicle operation or target preconditioning battery temperature for recharging the battery 105). In some examples, the battery heating and cooling system 106 is run in a heating cycle to increase the battery toward the target battery temperature. In other examples, the battery heating and cooling system 106 is run in a cooling cycle to cool the battery toward the target battery temperature.

At operation 306, an indication to provide occupant zone heating or cooling via the occupant zone hydronic system 126 may be received. In some examples, the indication may be a received request for heating/cooling of an occupant zone hydronic system 126. In some examples, the request may correspond to a user input received via a control panel. For instance, the control panel may provide options to turn on hydronic heating/cooling in the occupant zone 103, different levels of heating/cooling, a desired/target occupant zone temperature, etc. In some examples, the options may correspond to various target occupant zone temperatures. In some examples, the indication is an occupant zone temperature measurement outside the target occupant zone temperature. In further examples, the target occupant zone temperature corresponds to (e.g., is or is within a threshold of) the target battery temperature.

At decision operation 308, a determination may be made as to whether conditions are sufficient for providing ancillary heating or cooling to the occupant zone 103 using the battery heating and cooling system 106. In some examples, the battery management system 110 may evaluate a current status of the battery heating and cooling system 106, various sensor measurements corresponding to vehicle load conditions, occupant zone temperature, battery temperature, ambient temperature, occupant presence/location, etc., and determine whether the battery heating and cooling system's requirements and available resources allow heating/cooling power to be directed to the occupant zone hydronic system 126. In some examples, the battery management system 110 may determine to automatically provide ancillary heating or cooling to the occupant zone hydronic system 126 when the battery heating and cooling system 106 is being run to precondition the battery 105. In other examples, such as under higher load conditions, at certain occupant zone, battery, and/or ambient temperatures, or under other conditions, the battery management system 110 may prioritize heating/cooling the battery 105 over redirecting coolant to the occupant zone hydronic system 126.

When a determination is made to provide ancillary heating/cooling to the occupant zone 103, the hydronic system heating/cooling loop 216 may be opened to allow for heated/cooled coolant to flow through the occupant zone hydronic system 126 to heat/cool the occupant zone 103. For instance, one or more valves 218 may be adjusted to control a flow path of the coolant within the fluid battery circuit 201 through the hydronic object(s) 226 included in the occupant zone hydronic system 126. In some examples, the battery heating and cooling system 106 heats/cools the occupant zone 103 toward the target battery temperature. In some examples, the hydronic object(s) 226 included in the occupant zone hydronic system 126 may have a thermal mass that is negligible compared to the battery 105.

Figure 4A:
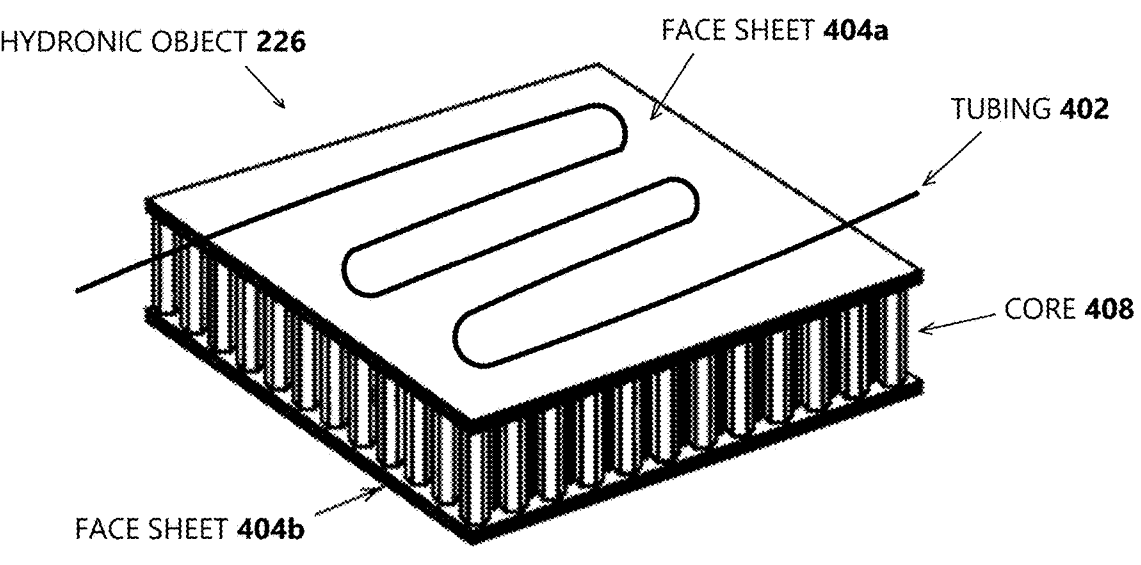
FIGS. 4A and 4B are illustrations of an example hydronic object that may be implemented in an occupant zone hydronic system.
Figure 4B:
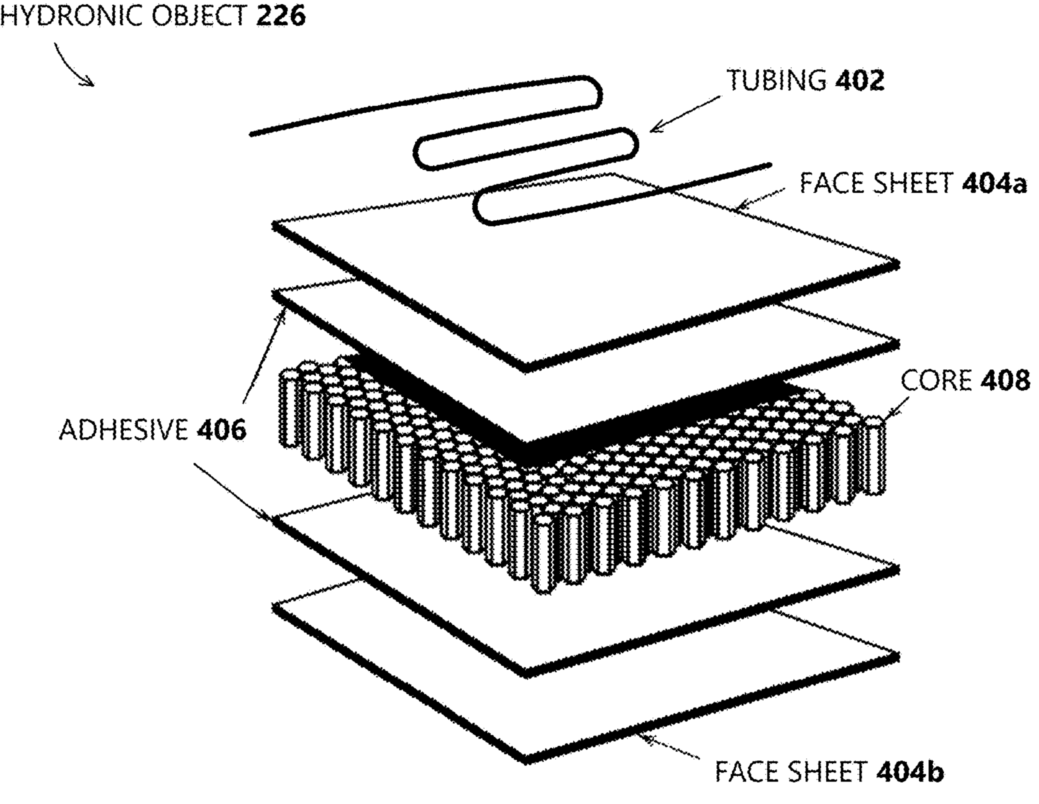

FIGS. 4A and 4B are illustrations of an example hydronic object 226, such as a hydronic panel that may be included in an occupant zone hydronic system 126 integrated into an occupant zone 103 of the vehicle 100. FIG. 4A depicts an assembled portion of the hydronic object 226 and FIG. 4B depicts an exploded view of the hydronic object portion. In some examples, the hydronic object 226 includes a first face sheet 404*a* and a second face sheet 404*b* (collectively, face sheets 404). In some examples, the face sheets 404 may be constructed from high-grade phenolic woven glass fiber. In other examples, other materials are used. Hydronic tubing 402 may be in fluid connection with the hydronic system heating/cooling loop 216 and embedded in the first face sheet 404*a*. For instance, the tubing 402 and channels formed into the first face sheet 404*a* may be designed to facilitate the circulation of heated or cool coolant. The tubing 402 may be positioned to ensure efficient heat transfer, providing optimal comfort and climate control in any environment. In some examples, a core 408, such as a honeycomb structure, may be positioned between the face sheets 404. In examples, the core 408 may be constructed of aluminum or another material and may allow for even and efficient heat distribution through the hydronic object 226. The core 408 may be attached to the face sheets 404 via adhesive or another bonding method. Other types of hydronic objects 226 are possible and are within the scope of the present disclosure.

Figure 5:
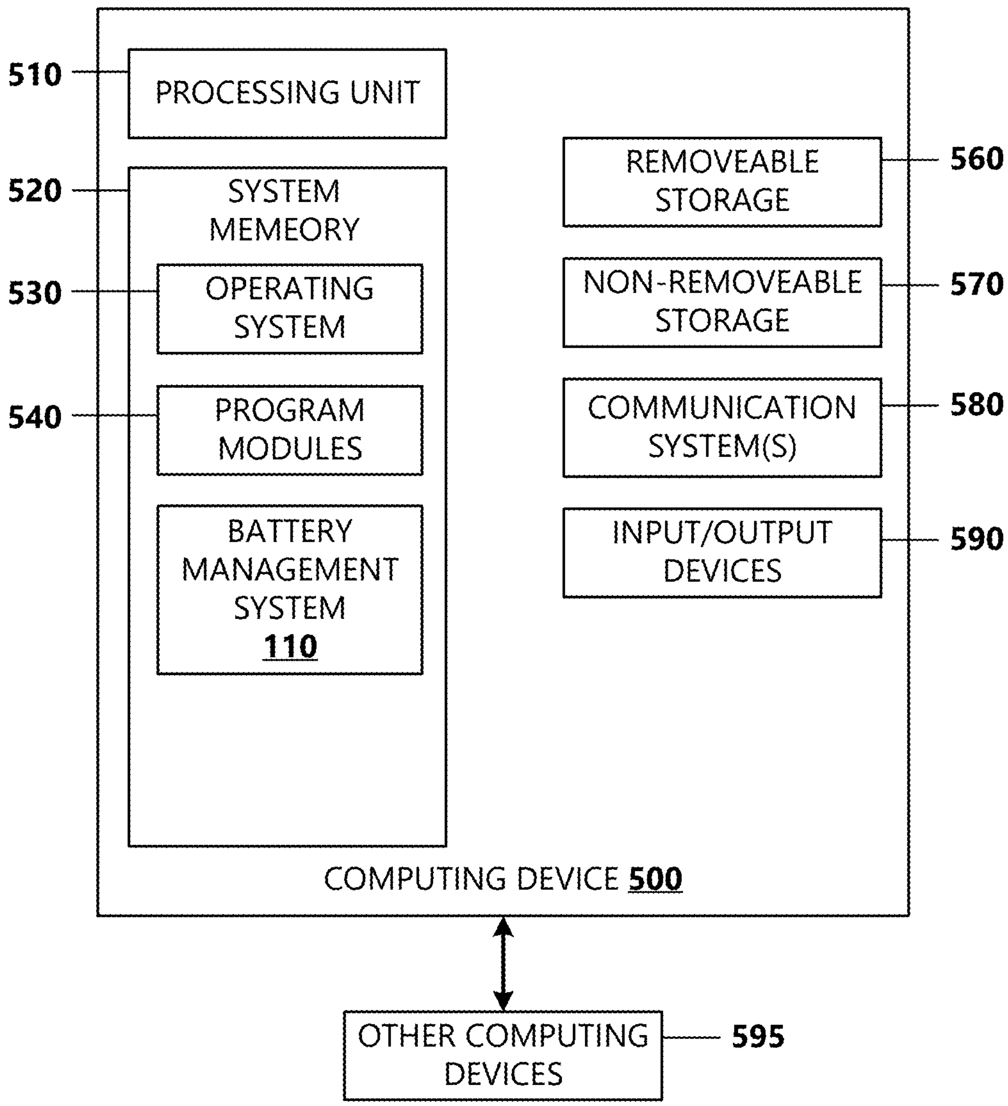
FIG. 5 is a block diagram illustrating example physical components of a computing device or system with which examples may be practiced.

FIG. 5 is a system diagram of a computing device 500 according to an example. As shown in FIG. 5, the physical components (e.g., hardware) of the computing device 500 are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for performing one more of the operations of the methods described above for providing robust network connectivity. A number of different program modules and data files may be stored in the system memory 520. While executing on the processing unit 510, the program modules 540 may perform the various processes described above. One example program module 540 includes sufficient computer-executable instructions for the battery management system 110.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 580 that enable the computing device 500 to communicate with other computing devices 595 such as, for example, routing engines, gateways, signings systems and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 500. Any such computer storage media may be part of the computing device 500. Computer storage media does not include a carrier wave or other propagated or modulated data signal.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, micro-code, etc.) may provide aspects discussed herein. Aspects may take the form of a computer program product on a computer-usable or computer-readable storage medium having computer-usable or computer-readable program code embodied in the medium for use by, or in connection with, an instruction execution system.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A vehicle, comprising:

an occupant zone, wherein the occupant zone is partially located exterior to the vehicle;

a battery;

a battery heating and cooling system including a refrigeration circuit and a fluid battery circuit, the fluid battery circuit including a battery heating/cooling loop and a hydronic system heating/cooling loop;

sensors, operatively connected to a battery management system and including at least one occupant sensor that senses the presence of an occupant in an occupant zone; and the battery management system including:

at least one processor; and a memory including instructions, which when executed by the at least one processor, cause the battery heating and cooling system to:

operate the refrigeration circuit to heat or cool coolant circulating though the battery heating/cooling loop to heat or cool the battery toward a target battery temperature;

receive an indication to provide ancillary heating or cooling to the occupant zone;

determine, based at least on the presence of an occupant in the occupant zone, that conditions are met for providing ancillary heating or cooling; and direct the coolant circulating though the battery heating/cooling loop to the hydronic system heating/cooling loop to heat or cool the occupant zone.

2. The vehicle of claim 1, wherein the hydronic system heating/cooling loop is fluidly connected to tubing embedded in a hydronic object.

3. The vehicle of claim 1, wherein the occupant zone is a sleeper compartment.

4. The vehicle of claim 1, wherein the indication to provide ancillary heating or cooling to the occupant zone comprises a temperature measurement of the occupant zone outside a target occupant zone temperature.

5. The vehicle of claim 1, wherein the indication to provide ancillary heating or cooling to the occupant zone comprises a user request to precondition the occupant zone.

6. The vehicle of claim 1, wherein in directing the coolant circulating though the battery heating/cooling loop to the hydronic system heating/cooling loop to heat or cool the occupant zone, the instructions cause the battery heating and cooling system to:

circulate the coolant to absorb heat from the battery in the battery heating/cooling loop;

receive an indication to provide ancillary heating to the occupant zone; and redirect the heat-absorbed coolant from the battery heating/cooling loop to the hydronic system loop.

* * * * *